Patented Jan. 13, 1931

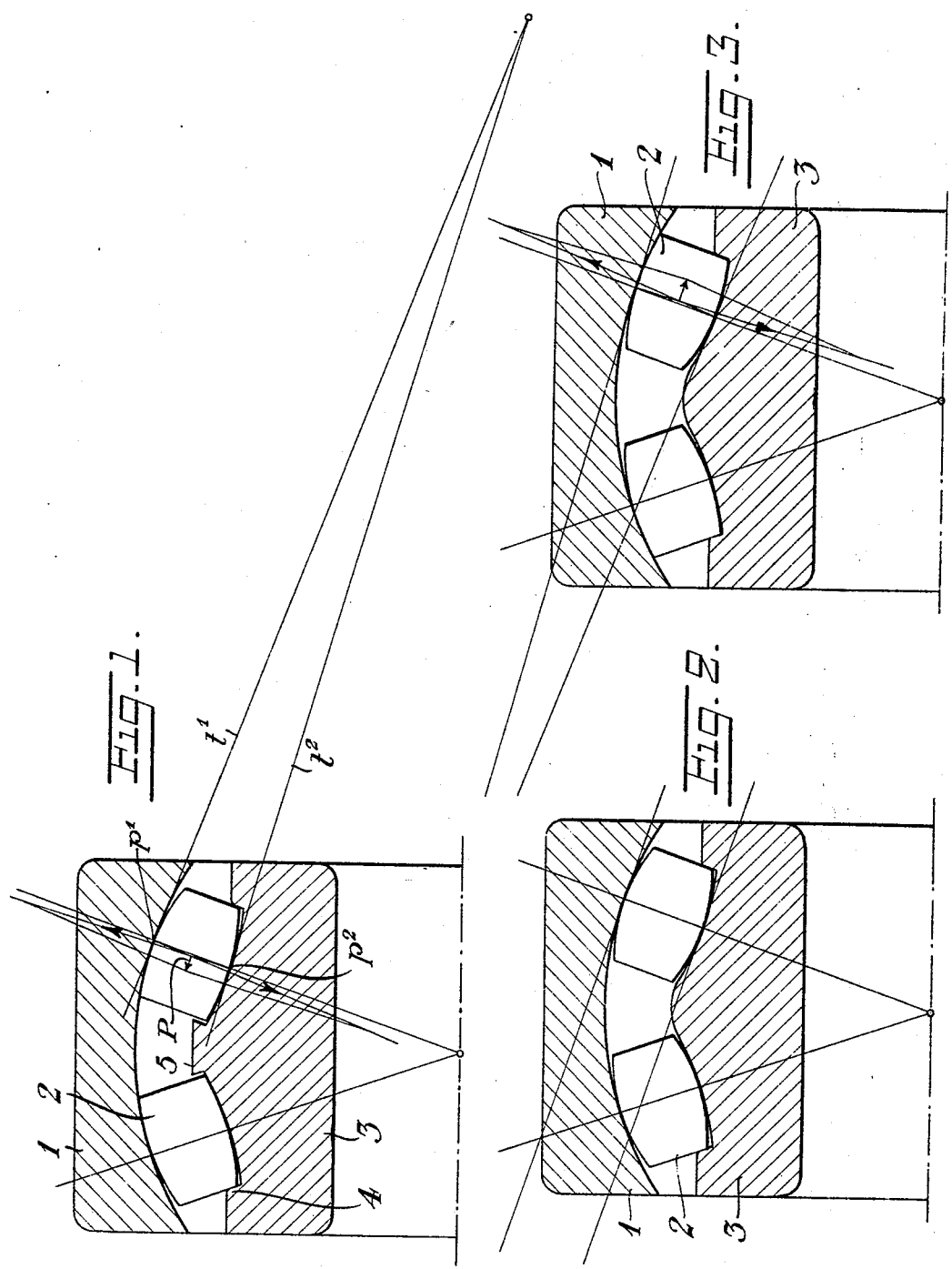

1,789,007

UNITED STATES PATENT OFFICE

KARL OSKAR LEON, OF LIDKOPING, SWEDEN

SELF-ADJUSTING ROLLER BEARING

Application filed October 8, 1928, Serial No. 311,079, and in Sweden March 7, 1928.

This invention relates to self-adjusting roller bearings of the double row type having a spherical race on the outer track ring.

In roller bearings of said type it is well-known so to shape and arrange the race of the inner track ring as well as the surface of the rollers in relation to said spherical race that the resultant pressures acting on a roller will give an axial thrust tending to move the roller inwardly towards the central plane of the bearing. In order to take up the pressure thus resulting from the roller it is already proposed to provide a flange at the inner track ring against which the roller is pressed. Said flange, however, serves not only to take up said pressure but also the pressure acting on the roller when the bearing is subjected to axial thrust, said pressure always tending to force one row of rollers or the other inwardly according as the pressure acts in one direction or the other.

At said flange there will thus be produced, already at an wholly radial pressure, a high sliding friction and a correspondingly high wear. At axial thrust said friction will be still more increased.

In the design of bearing above referred to it is necessary that the tangents to the rollers at those points, where the resultants of pressure at the track rings act, converge towards the axis of the bearing. In order to secure a proper rolling effect it has been already proposed to let these tangents intersect in a point on or adjacent to the axis of the bearing.

This invention has for its object to avoid the above said sliding friction and to reduce the sliding friction of the bearing as a whole. To this end the race or races of the inner track ring and the contact surface of the rollers are so shaped and arranged in relation to the spherical race of the outer track ring as to give the rollers a tendency of moving outwardly towards the respective end surface of the bearing, said tendency being counteracted by a flange provided on the inner track ring outside each row of rollers.

In the accompanying drawing three embodiments of the invention are illustrated in Figs. 1, 2, 3, respectively, said figures showing each an axial section through one half of their respective bearings.

Referring to the drawings, the outer track ring 1 is provided with a spherical race for the rollers 2, the inner track ring 3 having an individual concave race for each row of rollers. The shape of said last-mentioned races as well as the shape of the rollers is so chosen in relation to the spherical race of the outer track ring as to give the rollers, when in operation, a tendency of moving outwardly towards the respective end surface of the bearing. The conditions for such a tendency of rolling is that the tangents $t^1$, $t^2$ to a roller at those points $p^1$, $p^2$ where the resultants of pressures from the races of the bearing act, should either converge towards a point on the opposite side of the axis of the bearing (Fig. 1), or be parallel (Fig. 2), or diverge towards the axis of the bearing (Fig. 3). The roller will in each of said cases as far as the inner track ring is concerned act as a cylinder rolling on a cone, that is, it will have a tendency of rolling inwardly towards the apex of the cone, i. e. towards the respective end surface of the bearing.

It is true that in cases where the said tangents converge towards a point at the opposite side of the axis of the bearing (Fig. 1) the resultants of pressure from the races will give a force P tending to move the roller inwardly, said force, however, will be so small as compared with said tendency of rolling that it may be neglected. In case of parallel tangents, Fig. 2, said force will be equal to O, while in case of tangents diverging towards the axis, Fig. 3, said power will act outwardly, thereby assisting in moving the roller outwardly.

In order to counteract said outward movement of the roller there is provided a flange 4 on the inner track ring outside each row of rollers.

If desired, a guiding flange may also be provided inside each row of rollers, as shown at 5 in Fig. 1.

In case of axial thrust on such a bearing said thrust will be taken up as a pure rolling pressure by that row of rollers which is lying furtherest forward as seen in the direction of pressure; thus for instance, in case of a pressure in the direction of the arrow, Fig. 1, the pressure will be taken up by the left row of rollers, the respective flange 4 having a tendency to retire from the row of rollers, thereby wholly eliminating or considerably reducing the sliding friction at said flange. The rollers of the other row will only have a tendency of moving inwardly towards the point where the space between the track rings is wider and will, as a result, roll more freely than before.

What I claim is:

1. A self-adjusting roller bearing, comprising an outer race ring having a spherical race, two rows of rollers, an inner race ring having a non-spherical race for each row of rollers, said rollers engaging said last-mentioned races with a slight axial play, and a flange on said inner ring outside each row of rollers, the rollers and the races of said inner ring being of such shape and disposition in relation to said spherical race as to give the rollers a tendency of moving outwardly towards the respective end surface of the bearing.

2. A self-adjusting roller bearing, comprising an outer race ring having a spherical race, an inner race ring having two separate races of non-spherical shape, a flange on said inner ring outside each race, a flange on said inner ring between the races, and one row of rollers in engagement with each race of the inner ring in such a way as to be capable of a slight axial movement between the respective flanges, said rollers and the races of said inner ring being of such shape and disposition in relation to said spherical race as to give the rollers a tendency of moving outwardly towards the respective outer flange of the inner ring.

3. A self-adjusting roller bearing, comprising an outer race ring having a spherical race, an inner race ring having two separate races of non-spherical shape, a flange on said inner ring outside each race, a flange on said inner ring betwen the races, and one row of rollers in engagement with each race of the inner ring in such a way as to be capable of a slight axial movement between the respective flanges, said rollers and the races of said inner ring being of such shape and disposition both relatively to each other and in relation to said spherical race that the rollers will have a tendency of moving outwardly towards the respective outer flange of the inner ring and, when in contact therewith, will bear thereagainst at one point or with a continuous contact surface.

In testimony whereof I have signed my name.

KARL OSKAR LEON.